United States Patent Office 3,284,577 Patented Nov. 8, 1966

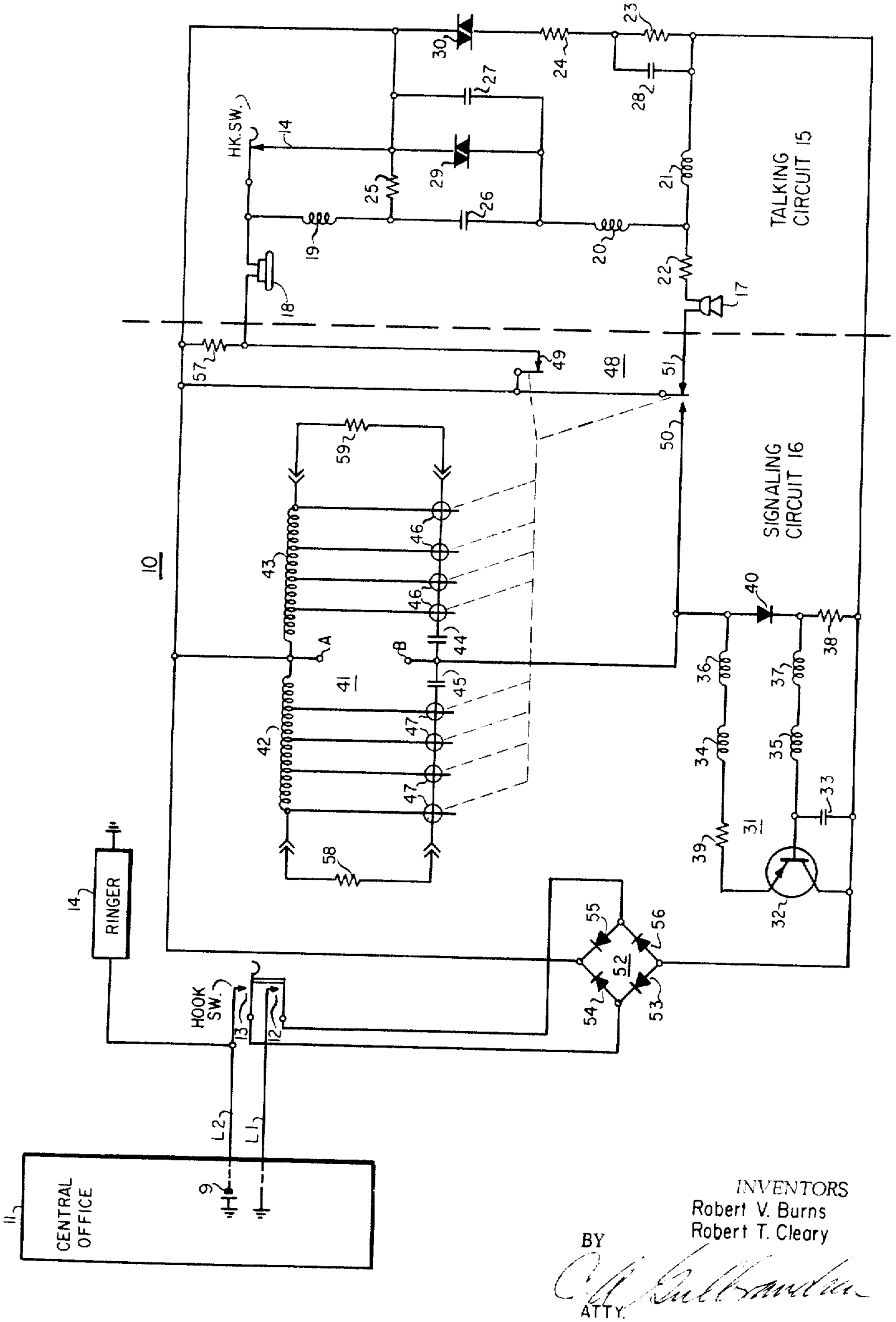
INVENTORS
Robert V. Burns
Robert T. Cleary
BY
ATTY.

3,284,577
SUBSTATION APPARATUS EMPLOYING A MULTIFREQUENCY SIGNALING ARRANGEMENT

Robert V. Burns, Markham, and Robert T. Cleary, Lockport, Ill., assignors to Automatic Electric Laboratories, Inc., Northlake, Ill., a corporation of Delaware Filed Oct. 10, 1963, Ser. No. 315,136
5 Claims. (Cl. 179—84)

This invention relates to telephone signaling arrangements and more particularly to multifrequency signaling arrangements in telephone substations.

Many substations have been designed which employ pushbuttons to activate frequency generating apparatus for signaling the central office. An arrangement employing such signaling means is described in United States Patent 3,064,084, "Telephone Substation Apparatus," issued to L. A. Meacham. Certain problems relating to oscillator build-up exist, however, in such arrangements. For example, coupling a damped oscillation from a tank circuit to an amplifier which is enabled after the damped wave has been generated creates a major problem. Before there is a chance of oscillator build-up, the damped wave may be dissipated. To clarify this point, early in the downward stroke of a pushbutton a charging circuit is established wherein two capacitances of two respective tank circuits charge. The inductances of these tank circuits already have a direct current flowing therethrough via connections established by the hookswitch contacts in an off-hook condition. Later in the downward stroke a break-make combination switch is operated. The break action of this switch opens the direct current path to the tank circuits permitting the flux of the inductances to collapse and generate damped oscillations in each tank circuit, these tank circuits being inductively coupled to a transistor amplifier. The make action of the switch then supplies an operating bias to the amplifier. Oscillation continues and a multifrequency signal is transmitted to the central office. The transition time between "break" and "make" must be quite fast or else the damped waves produced in the tank circuits will be dissipated before the transistor amplifier is enabled.

Furthermore, the aforementioned direct current traversing the windings of the tank circuit causes slight frequency shifts due to the heating effect.

The above break to make transition time can be made independent of pushbutton speed by employing a snap-action switch. However, there is still a transition time and problems still exist. The amount of pressure which can be applied to a pushbutton, the maximum and minimum stroke, the late-in-stroke operation requirement of the switch, and the mechanical linkage required to connect the switch in common to all pushbuttons present human and design engineering problems.

It is the object of the invention to provide an improved multifrequency signaling arrangement.

A more particular object of the invention is to provide an improved signaling arrangement having a substantially instantaneous oscillator build-up.

A further object of the invention is to provide an oscillator arrangement which is substantially free of frequency shift due to heating of the tank circuit windings by a direct current.

A feature of the invention resides in the use of a simple make switch combination which eliminates the above-mentioned transition time and provides simultaneous generation of oscillations and enabling of a transistor amplifier.

Other objects and features not specifically set forth will become apparent from the following description taken in conjunction with an embodiment of the invention described in the accompanying drawing.

In that drawing are a subscriber substation 10 and a central office 11. Substation 10 is connected to the central office by lines L1 and L2. A ringer 14 is connected to line L2. The central office is of course equipped with multifrequency detecting apparatus.

More particularly, and for purpose of illustration, substation 10 has been divided into two portions, a talking circuit 15 as is well known and a signaling circuit 16.

Talking circuit 15 includes such components as a transmitter 17, a receiver 18, and an induction coil having windings 19, 20 and 21. Elements 22–30 and the transmitter, receiver, and induction coil are connected, in general, as commonly practiced.

To the left of the dashed line is signaling circuit 16 comprising an amplifier circuit 31, a dual tank circuit 41 and a switch 48. Amplifier circuit 31 includes a transistor 32, a capacitance 33, inductances 34–37, resistances 38 and 39, and diode 40. Dual tank circuit 41 includes as one tank circuit capacitance 45 and tapped inductance 42, and as the other tank circuit capacitance 44 and tapped inductance 43. Inductances 42, 34 and 35 are closely coupled as are inductances 43, 36 and 37 to transfer the generated oscillations in the tanks to the amplifier 31. Pushbuttons (not shown), usually ten in number, are employed to close crosspoints 46 and 47, each button closing one of crosspoints 46 and one of crosspoints 47 to select two frequencies which are indicative of a digit. Switch 48 being common to all pushbuttons is operated by the depression of any of said pushbuttons as will be explained in greater detail below.

Diode bridge 52 including diodes 53–56 maintains a constant polarity should battery reversal occur.

Still referring to the drawing, assume that the subscriber at substation 10 wishes to make a telephone call. When the handset is removed from the cradle, the hookswitch operates. Contacts 12 and 13 connect substation 10 to the central office 11 via lines L1, L2. Contact 14 opens and receiver 18 is enabled. Dial tone is received in a well known manner and the subscriber may proceed to dial depressing a pushbutton for each digit in sequence.

As each pushbutton is depressed a plurality of actions occur. Early in the downward stroke a crosspoint 46 and a crosspoint 47 close to select the two frequencies to be transmitted. Capacitances 44 and 45 charge through a path including the central office battery 9 in central office 11, line conductor L1, hookswitch contact 12, diode 55 of diode bridge 52, the selected portions of the corresponding tank inductances 42 and 43, diode 40, resistance 38, diode 53 of diode bridge 52, hookswitch contact 13, line conductor L2 and back to the central office battery. Late in the downward stroke switch 48 operates. Contact 49 opens providing attenuation for receiver 18 via resistance 57. Contact 51 opens the transmitter 17 circuit to provide "talk-off" or "talk-down" protection, that is, to prevent voice frequencies in the room from effecting signaling since in practical applications the multifrequency signals are in this frequency range.

It should be noted that the just-mentioned break actions of contacts 49 and 51 have nothing to do with the tank circuits. Contacts 50 and 51 only appear as a break-make combination as a convenient instrument for two substantially separate circuits. Contact 50, when closed, places a shunt across the tank circuits by effectively connecting terminal A to terminal B.

Contact 50, a simple make contact, closes and capacitances 44 and 45 discharge through their respective inductances each generating in its own tank circuit an oscillation of a frequency distinct from the other. Simultaneously operating bias is supplied to the amplifier circuit 31, diode 40 and resistance 38 being effectively across line conductors L1 and L2 by the closure of contact 50.

The simultaneous actions of generating the two frequencies and enabling the amplifier, eliminate the problem of transition time since only a make action is required rather than a break-make action. Furthermore, there is no direct current imposed on the tank coils eliminating a frequency shift which would result therefrom.

A modification of the circuit arrangement may be made by connecting resistances 58 and 59 of a value which would not interfere with the operation of the tank circuits. This would allow the capacitances to charge between digits. Theoretically, it is possible that without resistances 58 and 59 the time between closure of crosspoints 46, 47 and contact 56 could be short enough so as to be insufficient for excitation. Tests have indicated, however, that less than 0.2 millisecond are required for charging and mechanical linkages provide 10–30 milliseconds even with the most rapid button depressions.

Many other changes and modifications may be made in the invention without departing from the spirit and scope of the invention and should be included in the appended claims.

What is claimed is:

1. A telephone signaling arrangement comprising a resonant circuit having a plurality of selectively controllable resonant frequencies, means for selecting a frequency of said resonant circuit, amplifier means coupled to said rêsonant circuit and including a biassing circuit, a circuit extending over said resonant circuit and said biassing circuit in series, and switching means operative to short circuit the resonant circuit portion of said series circuit for simultaneously starting oscillations of said resonant circuit and rendering said amplifier means effective whereby sustained oscillations are set up at said selected frequency.

2. A telephone signaling arrangement comprising a resonant circuit including capacitance means and inductance means, means for selectively connecting portions of said inductance means to said capacitance means for selecting a desired one of a plurality of resonant frequencies, means including said selective connecting means for charging said capacitance means, amplifier means coupled to said inductive means and means connected to said amplifier means and to said resonant circuit for discharging said capacitance means through said inductance means to generate oscillations and for simultaneously conditioning said amplifier for operation, whereby sustained oscillations are set up at said selected frequency.

3. A telephone signaling arrangement, as claimed in claim 2, and further comprising resistance means connected between said capacitance means and said inductance means bypassing said selective means, said resistance means permitting charging of said capacitance means independent of said selective means.

4. A telephone substation circuit of the central-battery type having a pair of line terminals and a voice-frequency signaling generator, said generator including amplifying means and a plurality of resonant elements comprising inductive means and capacitive means, means for selecting a combination of said elements to preselect a desired resonant frequency, circuit connections from said resonant elements to said line terminals for supplying said resonant elements with direct current and make contact means linked to said selecting means for completing a shunt connection across the selected combination of resonant elements to initiate oscillations of said desired frequency between said inductive means and said capacitance means of said combination and for simultaneously completing a connection from said amplifying means to said terminals for enabling said amplifying means to sustain said oscillations.

5. A telephone susbstation circuit of the central-battery type having a pair of line terminals and a voice-frequency signaling generator, said generator including amplifying means and a plurality of resonant elements comprising a plurality of inductive means and a plurality of capacitance means, means for selecting a plurality of combinations of said elements to preselect a desired combination of resonant frequencies, each said combination of elements including at least one of said inductive means and at least one of said capacitive means, circuit connections from said resonant elements to said line terminals for supplying said resonant elements with direct current and a make contact linked to said selecting means for completing a shunt connection across the selected combinations of resonant elements to initiate oscillations of said desired frequencies between corresponding inductive and capacitive elements of each said combination and to simultaneously complete a connection from said amplifying means to said line terminals for enabling said amplifying means to sustain said oscillations.

References Cited by the Examiner

UNITED STATES PATENTS 3,184,554 5/1965 Meacham et al. ------ 179—84

KATHLEEN H. CLAFFY, *Primary Examiner.*

H. ZELLER, *Assistant Examiner.*